United States Patent
Daoura

(10) Patent No.: US 9,313,667 B1
(45) Date of Patent: Apr. 12, 2016

(54) CELLULAR COMMUNICATION NETWORK THROUGH UNMANNED AERIAL VEHICLE CELLULAR COMMUNICATION LINKS

(71) Applicant: The Boeing Company, Chicago, IL (US)

(72) Inventor: Daniel J. Daoura, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/573,804

(22) Filed: Dec. 17, 2014

(51) Int. Cl.
| | |
|---|---|
| *H04W 16/24* | (2009.01) |
| *B64C 39/02* | (2006.01) |
| *G05D 1/00* | (2006.01) |
| *H04W 84/04* | (2009.01) |
| *H04W 84/06* | (2009.01) |
| *H04W 88/04* | (2009.01) |

(52) U.S. Cl.
CPC ............. *H04W 16/24* (2013.01); *B64C 39/024* (2013.01); *G05D 1/0011* (2013.01); *B64C 2201/122* (2013.01); *B64C 2201/146* (2013.01); *H04W 84/042* (2013.01); *H04W 84/06* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 6,742,741 B1 * | 6/2004 | Rivoli ........................... | 244/12.1 |
| 2007/0284474 A1 * | 12/2007 | Olson et al. ...................... | 244/10 |
| 2008/0004040 A1 * | 1/2008 | Bogart ......................... | 455/456.1 |
| 2012/0218301 A1 * | 8/2012 | Miller ........................... | 345/633 |
| 2012/0268321 A1 * | 10/2012 | Brekke ..................... | 342/357.29 |
| 2014/0316614 A1 * | 10/2014 | Newman ........................... | 701/3 |
| 2015/0097669 A1 * | 4/2015 | Li .............................. | 340/539.13 |
| 2015/0115108 A1 * | 4/2015 | Benson et al. .............. | 244/53 R |

* cited by examiner

*Primary Examiner* — Ashish K Thomas
(74) *Attorney, Agent, or Firm* — Joseph M. Rolnicki; Evans & Dixon, L.L.C.

(57) ABSTRACT

A cellular communication network utilizes cellular communication receivers and cellular communication transmitters in a plurality of unmanned aerial vehicles that are deployed or flown in a point to point line or mesh like environment enabling a ground to air, air to air and air to ground cellular datalink communications network.

19 Claims, 2 Drawing Sheets

CELLULAR COMMUNICATION NETWORK THROUGH UNMANNED AERIAL VEHICLE CELLULAR COMMUNICATION LINKS

FIELD

This disclosure pertains to a cellular communication network that utilizes cellular communication receivers and cellular communication transmitters in unmanned aerial vehicles. More particularly, this disclosure pertains to a cellular communication network that utilizes cellular communication receivers and cellular communication transmitters in a plurality of unmanned aerial vehicles that are deployed or flown in a point to point line or mesh like environment establishing a ground to air, air to air and air to ground cellular datalink communications network.

BACKGROUND

Communication systems that communicate over the horizon and are not line of sight communication systems typically employ one or more satellites. In a typical satellite communication system a first ground antenna transmits communication signals to a satellite in a geostationary orbit over the earth. The satellite then relays the communication signals to a second ground antenna. Communication systems such as this are employed for transmitting commercial communication signals and military communication signals. Satellite communication systems such as this are expensive to produce and implement. The communication system components are expensive, large and heavy. Furthermore, satellite communication systems used for military communications have the vulnerability that, should the satellite be disabled, the link between the ground antennas is broken.

SUMMARY

The cellular communication network of this disclosure provides an over the horizon communication network that does not employ a satellite link and is not vulnerable to a break in the communication system due to a satellite being disabled.

The cellular communication network employs a plurality of unmanned aerial vehicles or drones. Each of the unmanned aerial vehicles is equipped with a cellular communication signal receiver and a cellular communication signal transmitter.

The cellular communication network also employs at least one control base that controls at least one of the unmanned aerial vehicles. The control base has a control transmitter that transmits control signals to a first one of the plurality of unmanned aerial vehicles for controlling a flight of the first unmanned aerial vehicle. Because the control signals are transmitted directly to the first unmanned aerial vehicle, the control signals are transmitted as line of sight signals. The control transmitter transmits the control signals a set distance from the control base. Thus, the control base is only capable of controlling the flight of the unmanned aerial vehicle within the set distance from the control base.

Additionally, the unmanned aerial vehicles or drones of the cellular communication network can function as a cellular or mobile network mesh where the unmanned aerial vehicles communicate and relay information without control, such as in a mobile ad hoc network. Essentially, all of the unmanned aerial vehicles can be controlled through one master unmanned aerial vehicle or node, with mesh networking of the cellular communication. This essentially makes all of the nodes function as relay nodes that transmit and forward data between the nodes so that the data is received at a desired destination node.

Other unmanned aerial vehicles of the plurality of unmanned aerial vehicles in the communication network have flight control systems that are pre-programmed with control signals. The pre-programmed control signals autonomously control flight of the other unmanned aerial vehicles beyond the set distance from the control base.

The cellular communication network also includes a cellular communication base. The cellular communication base has a cellular communication receiver that receives cellular communication signals and a cellular communication transmitter that transmits cellular communication signals. The cellular communication base can be mobile, for example a handheld cellular phone, a cellular communication base provided on an aircraft or a cellular communication base provided on a ship. Additionally, the cellular communication base could be stationary, for example a cell site or cell tower.

In use of the cellular communication network, the control base controls a flight of a first of the unmanned aerial vehicles where the flight of the first unmanned aerial vehicle is within the set distance from the control base. The other unmanned aerial vehicles of the plurality of unmanned aerial vehicles have controlled flights beyond the set distance of the control base. The controlled flights of the other unmanned aerial vehicles are controlled by the flight control systems of the unmanned aerial vehicles. The flight control systems with their pre-programmed control signals autonomously control the flights of the other unmanned aerial vehicles beyond the set distance from the control base. The flights of the other unmanned aerial vehicles can be arranged as points along a line of cellular communication with each of the points being within a line of sight or line of cellular communication with adjacent unmanned aerial vehicles. Additionally, the flights of the other unmanned aerial vehicles could be arranged in a two-dimensional or three-dimensional array of points where each of the points is within a line of sight or line of cellular communication between adjacent unmanned aerial vehicles.

Cellular communication signals are transmitted from the cellular communication base to the cellular communication receiver of the first unmanned aerial vehicle. The cellular communication signals are then relayed from the cellular communication signal transmitter of the first unmanned aerial vehicle to one of the other unmanned aerial vehicles in the plurality of unmanned aerial vehicles of the network. From the subsequent unmanned aerial vehicle, the cellular communication signals are relayed to a further unmanned aerial vehicle of the plurality of unmanned aerial vehicles. In this manner, the cellular communication signals are relayed through the cellular communication network to the desired recipient of the cellular communication signals, for example a handheld cellular telephone, a cellular communication base on an aircraft, a cellular communication base on a ship, or a stationary cellular communication base such as a cell site or cell tower.

The cellular communication network is thus not dependent on a communications satellite. The network leverages existing cellular infrastructure as well as cellular technology for one-to-one communication between unmanned aerial vehicles to extend a communication link and the transmission of critical data from a source to wherever it is needed.

The features, functions, and advantages that have been discussed can be achieved independently in various embodiments or may be combined in yet other embodiments further details of which can be seen with reference to the following description and drawings.

DETAILED DESCRIPTION

Figure 1:
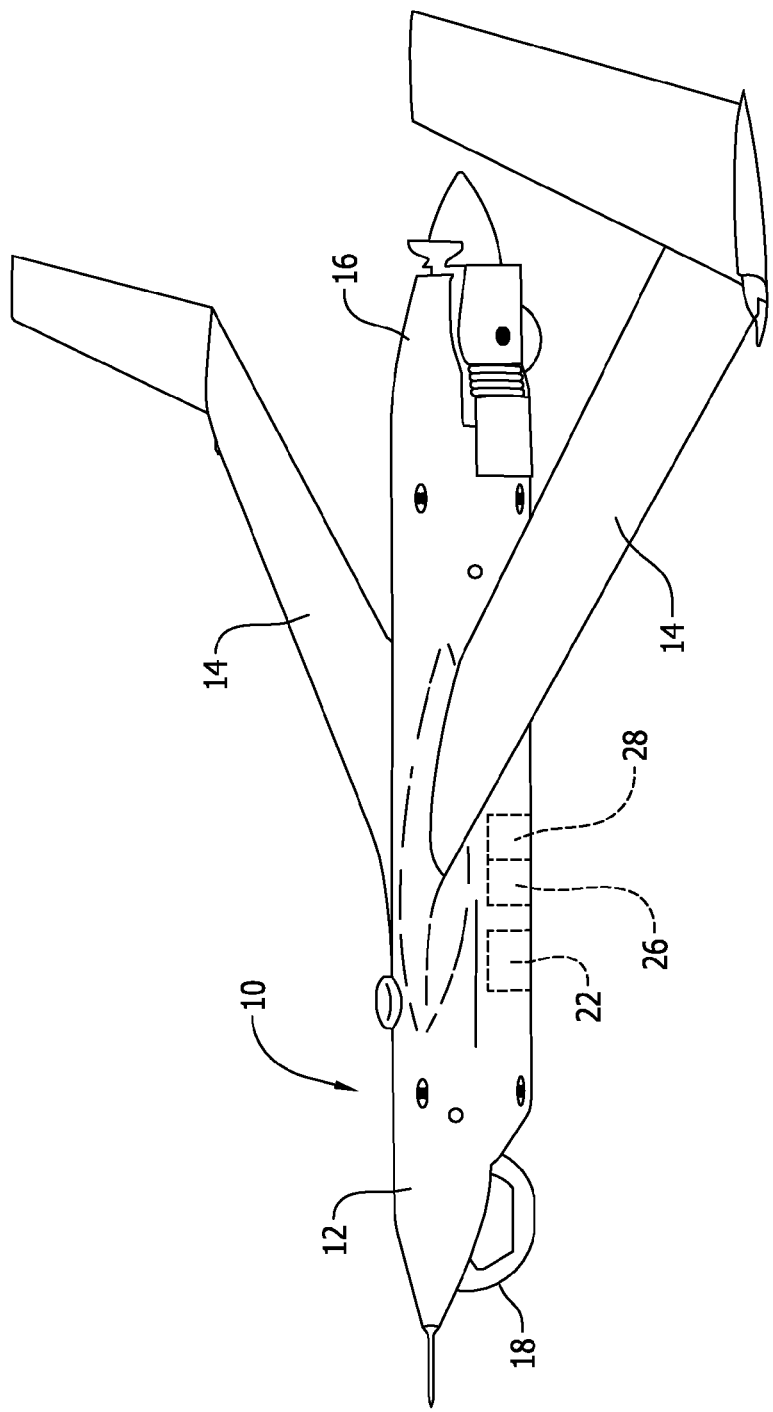
FIG. 1 is a representation of an unmanned aerial vehicle or drone that is employed as a link in the cellular communication network of this disclosure.

The cellular communication network employs a plurality of unmanned aerial vehicles or UAVs such as that represented in FIG. 1. The UAV 10 has a conventional construction with a fuselage 12 having about a four foot length and wings 14 having about a ten foot wingspan. A propeller propulsion unit 16 is provided at the rearward end of the fuselage 12. A sensor turret 18 is provided at the forward end of the fuselage 12. The sensor turret 18 is conventional and could contain an optic sensor that senses images of objects the UAV 10 flies over. The sensor turret 18 could also include a data transmission sensor that senses foreign communication data transmissions in the area of the UAV 10 flight. The fuselage 12 of the UAV 10 also contains the avionics or flight control system 22 that controls the flight of the UAV 10. The flight control system 22 includes a control signal receiver that receives control signals transmitted by a control base transmitter. The flight control system 22 controls the flight of the UAV 10 based on the control signals received.

The UAV 10 represented in FIG. 1 differs from conventional UAV's in that it also has a cellular communication signal receiver 26 in the UAV fuselage 12. The cellular communication signal receiver 26 receives conventional cellular communication signals. The UAV 10 also differs from conventional UAV's in that it also has a cellular communication signal transmitter 28 in the UAV fuselage 12. The cellular communication signal transmitter 28 transmits conventional cellular communication signals.

Figure 2:
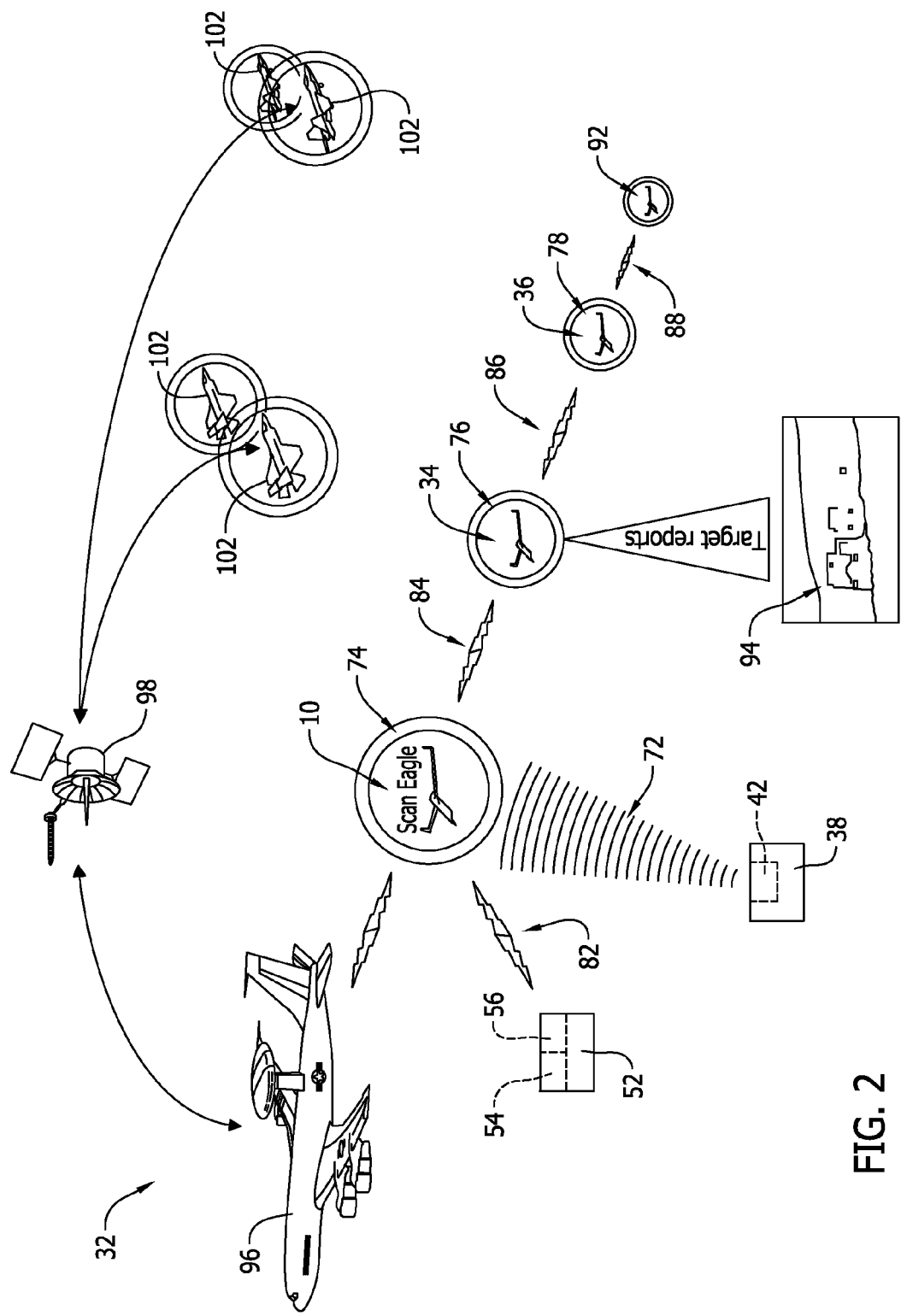
FIG. 2 is a representation of the cellular communication network.

The UAV 10 represented in FIG. 1 is a first unmanned aerial vehicle 10 of a plurality of like unmanned aerial vehicles that make up the cellular communication network. Each of the plurality of UAVs of the cellular communication network are basically the same. The cellular communication network 32 is represented in FIG. 2. As represented in FIG. 2, the cellular communication network 32 includes the first UAV 10, a second UAV 34, a third UAV 36, etc. The cellular communication network 32 can be made up of as many UAVs as needed for the intended geographic scope of the network.

In addition to the plurality of UAVs, the cellular communication network also employs at least one control base 38. The control base 38 is a conventional control base that controls at least one of the UAVs of the cellular communication network. The control base 38 is represented schematically in FIG. 2 and includes a control transmitter 42 that transmits control signals to an UAV, for example the first UAV 10 of FIG. 1. The control signals control the flight of the first UAV 10. The control base 38 is an earth bound base and therefore cannot transmit control signals over the horizon. Therefore, the control base transmitter 42 transmits the control signals a set distance from the control base 38. Thus, the control base 38 is only capable of controlling the flight of the first UAV 10 within the set distance from the control base 38.

Additionally, the unmanned aerial vehicles or drones of the cellular communication network can function as a cellular or mobile network mesh where the unmanned aerial vehicles communicate and relay information without control, such as in a mobile ad hoc network. Essentially, all of the unmanned aerial vehicles can be controlled through one master unmanned aerial vehicle or node, with mesh networking of the cellular communication. This essentially makes all of the nodes function as relay nodes that transmit and forward data between the nodes so that the data is received at a desired destination node.

Unmanned aerial vehicles in the cellular communication network that are not controlled by the control base 38, for example the second UAV 34 and the third UAV 36 have flight control systems that are pre-programmed with control signals. The pre-programmed control signals autonomously control flight of the UAVs 34, 36 beyond the set distance from the control base 38.

The cellular communication network 32 also includes a cellular communication base 52. The cellular communication base 52 is represented schematically in FIG. 2. The cellular communication base 52 has a conventional cellular communication receiver 54 that receives cellular communication signals. The cellular communication base 52 also has a conventional cellular communication transmitter 56 that transmits cellular communication signals. The cellular communication base 52 could be mobile, for example a handheld cellular phone. The cellular communication base 52 could also be provided on an aircraft, on a ship, or some other equivalent type of mobile platform. Additionally, the cellular communication base 52 could be stationary, for example a cell site or cell tower.

In the use of the cellular communication network 32 represented in FIG. 2, the control base 38 is operated by a user to transmit control signals 72 to the first UAV 10. The control signals 72 control a flight of the first UAV 10 to and in a desired geographic area or cell 74. As explained earlier, the flight area or cell 74 of the first UAV 10 is within the set distance from the control base 38. The UAVs, for example the second UAV 34 and the third UAV 36 are also operated by users to initiate their flights. The second UAV 34 and the third UAV 36 are flown to respective second 76 and third 78 geographic areas or cells that are both beyond the set distance of the control base 38. The flights to and in the second 76 and third 78 cell areas by the respective second 34 and third 36 UAVs are controlled by their flight control systems. As explained earlier, the flight controlled systems of the second 34 and third 36 UAVs are preprogrammed with control signals. The preprogrammed control signals autonomously control the flights of the second 34 and third 36 UAVs beyond the set distance from the control base 38 to and within their respective cell areas 76, 78. As represented in FIG. 2, the flight cells of the first UAV 10, the second UAV 34 and the third UAV 36, as well as any other additional UAV's can be arranged as points along a line of cellular communication with each of the points being within a line of sight or line of cellular communication with adjacent UAV. Additionally, the flights of the second UAV 34, third UAV 36 and any other additional UAVs can be arranged in a two-dimensional or three-dimensional array of points where each of the points is within a line of sight or line of cellular communication between adjacent UAVs in the network.

Cellular communication signals 82 are transmitted from the cellular communication base transmitter 56 to the cellular communication receiver 26 of the first UAV 10 as represented in FIG. 2. The cellular communication signals received by the cellular communication signal receiver 26 of the first UAV 10 are then relayed and sent as cellular communication signals 84 from the cellular communication signal transmitter 28 of the first UAV 10 to the cellular communication signal receiver of the second UAV 34. From the second UAV 34, a cellular communication signal 86 is relayed and sent to the cellular communication signal receiver of the third UAV 36. From the third UAV 36 a cellular communication signal 88 can be relayed further on to another UAV 92 of the plurality of UAVs in the cellular communication network. Furthermore, any of the cellular communication signals 84, 86, 88 could be sent to a cell site or cell tower cellular communication signal receiver and transmitter as a further link in the communication network.

As discussed earlier, each of the UAVs in the plurality of UAVs in the cellular communication network could be equipped with a sensor turret 18. FIG. 2 represents a sensor turret of the second UAV 34 sensing vehicles 94 on the ground. This sensed information can be communicated through cellular communication signals from the second UAV 34 to the first UAV 10 and further communicated from the first UAV 10 to an aircraft 96, for example an airborne warning and control system (AWAC) aircraft. This information can be further communicated to a satellite 98 which could then relay the information on to attack aircraft 102 providing the aircraft with information on the vehicles 94 located by the second UAV 34.

Although the cellular communication network 32 has been described herein as transmitting cellular communications signals, in military applications the network could transmit encoded communications signals. For example, the communication signals could be transmitted as encoded by the joint range extension application protocol (JREAP) which enables tactical data to be transmitted over digital media and networks not originally designed for tactical data exchange.

Embodiments include unmanned aerial vehicle communications over cellular, including air-to-air, air-to-ground, and ground-to-air. These communications can leverage existing cellular infrastructure as well as cellular technology for one to one communication between UAVs to extend communication link and critical data from source to wherever it's needed. Unlike conventional Mission Communications systems, which are expensive, heavy and large, embodiments extend a tactical data exchange network (e.g., Link 16 capability) through a low cost solution and provide an alternative to existing control methods, which if down, do not provide a means for cellular guided "smart" GPS. Further, conventional systems to not provide a way of communicating Link 16 military datalinks over small UAVs such as the ScanEagle.

As various modifications could be made in the construction of the cellular communication network and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A first unmanned aerial vehicle, the first unmanned aerial vehicle having a first flight control system that controls flight of the first unmanned aerial vehicle, the first unmanned aerial vehicle having a first cellular communication signal receiver that receives cellular communication signals, and the first unmanned aerial vehicle having a first cellular communication signal transmitter that transmits cellular communication signals;
   a control base, the control base having a control transmitter that transmits control signals to the first flight control system for controlling a flight of the first unmanned aerial vehicle;
   a cellular communication base, the cellular communication base having a cellular communication receiver that receives cellular communication signals and a cellular communication transmitter that transmits cellular communication signals to the first unmanned aerial vehicle that are received by the first cellular communication signal receiver of the first unmanned aerial vehicle and are relayed by the first unmanned aerial vehicle by being transmitted as a cellular communication signal from the first cellular communication signal transmitter; and,
   a second unmanned aerial vehicle, the second unmanned aerial vehicle having a second cellular communication signal receiver that receives the cellular communication signal transmitted from the first cellular communication signal transmitter, and the second unmanned aerial vehicle having a second cellular communication signal transmitter that transmits cellular communication signals received from the first cellular communication signal transmitter.

2. The communication network of claim 1, further comprising:
   the second unmanned aerial vehicle having a second flight control system with pre-programmed control signals that autonomously control flight of the second unmanned aerial vehicle.

3. The communication network of claim 1, further comprising:
   the cellular communication base being mobile.

4. The communication network of claim 3, further comprising:
   the cellular communication base being handheld.

5. The communication network of claim 1, further comprising:
   the cellular communication base being stationary.

6. The communication network of claim 5, further comprising:
   the cellular communication base being a cell site.

7. A communication network comprising:
   a control base, the control base having a control transmitter that transmits control signals for controlling a flight of an unmanned aerial vehicle, the control transmitter transmitting the control signals a set distance from the control base;
   a first cellular communication base, the first cellular communication base having a cellular communication receiver that receives cellular communication signals and a cellular communication transmitter that transmits cellular communication signals;
   a first unmanned aerial vehicle, the first unmanned aerial vehicle having a flight control system that controls flight of the first unmanned aerial vehicle, a control signal receiver that receives control signals transmitted by the control transmitter within the set distance from the control base whereby the control base controls flight of the first unmanned aerial vehicle within the set distance from the control base, the first unmanned aerial vehicle having a first cellular communication signal receiver that receives cellular communication signals transmitted by the cellular communication base and the first unmanned aerial vehicle having a first cellular communication signal transmitter that transmits cellular communication signals received from the cellular communication base; and,
   a second unmanned aerial vehicle, the second unmanned aerial vehicle having a second cellular communication signal receiver that receives cellular communication signals transmitted by the first cellular communication signal transmitter, and the second unmanned aerial vehicle having a second cellular communication signal transmitter that transmits cellular communication signals received from the first cellular communication signal transmitter.

8. The communication network of claim 7, further comprising:
a third unmanned aerial vehicle, the third unmanned aerial vehicle having a third cellular communication receiver that receives cellular communication signals transmitted by the second cellular communication signal transmitter, and the third unmanned aerial vehicle having a third cellular communication signal transmitter that transmits cellular communication signals received from the second cellular communication signal transmitter.

9. The communication network of claim 7, further comprising:
the second unmanned aerial vehicle having a second flight control system with pre-programmed control signals that autonomously control flight of the second unmanned aerial vehicle beyond the set distance from the control base.

10. The communication network of claim 7, further comprising:
a manned aerial vehicle, the manned aerial vehicle having a cellular communication receiver that receives cellular communication signals transmitted from at least one of the first cellular communication signal transmitter and the second communication signal transmitter.

11. The network of claim 7, further comprising:
the first cellular communication base being mobile.

12. The communication network of claim 11, further comprising:
the first cellular communication base being a handheld cellular telephone.

13. The communication network of claim 7, further comprising:
the first cellular communication base being stationary.

14. The communication network of claim 13, further comprising:
the first cellular communication base being on a cellular tower.

15. The communication network of claim 7, further comprising:
at least one of the first unmanned aerial vehicle and the second unmanned aerial vehicle having an optical sensor.

16. The communication network of claim 7, further comprising:
at least one of the first unmanned aerial vehicle and the second unmanned aerial vehicle having a data transmission sensor.

17. A method of relaying a cellular communication signal, the method comprising:
providing a first unmanned aerial vehicle with a first cellular communication signal receiver and a first cellular communication signal transmitter;
providing a second unmanned aerial vehicle with a second cellular communication signal receiver and a second cellular communication signal transmitter;
controlling a flight of the first unmanned aerial vehicle from a control base where the flight of the first unmanned aerial vehicle is within a set distance from the control base;
controlling a flight of the second unmanned aerial vehicle beyond the set distance of the control base;
transmitting a cellular communication signal from a cellular communication base to the first cellular communication receiver; and,
relaying the cellular communication signal by transmitting the cellular communication signal from the first cellular communication signal transmitter to the second cellular communication signal receiver.

18. The method of claim 17, further comprising:
transmitting the cellular communication signal from the cellular communication base that is a mobile cellular communication base.

19. The method of claim 17, further comprising:
transmitting the cellular communication signal from the cellular communication base that is a stationary cell site.

* * * * *